United States Patent [19]

Obata et al.

[11] Patent Number: 5,321,634
[45] Date of Patent: Jun. 14, 1994

[54] AUTOMATIC THIN-FILM MEASURING APPARATUS

[75] Inventors: Masanori Obata; Jyunichi Arima; Yoshihiro Hirata, all of Itami, Japan

[73] Assignee: Mitsubishi Denki Kabushiki Kaisha, Tokyo, Japan

[21] Appl. No.: 850,026

[22] Filed: Mar. 12, 1992

[30] Foreign Application Priority Data

Nov. 28, 1991 [JP] Japan .................. 3-314851

[51] Int. Cl.$^5$ .............. G01B 7/06; G06F 15/20
[52] U.S. Cl. ........................ 364/563; 364/567; 364/568; 364/468; 364/478; 364/571.01; 177/25.11; 177/25.12; 177/25.13; 177/50; 414/222
[58] Field of Search ........ 364/567, 568, 468, 469, 364/472, 478, 563, 468, 567, 571; 414/222, 21; 73/31.06, 83; 118/712, 690; 901/6; 177/164, 25.11, 25.12, 25.13, 50; 437/78, 121, 228

[56] References Cited

U.S. PATENT DOCUMENTS 4,661,920 4/1987 Haze ................. 364/567 X
5,104,276 4/1992 Severns et al. ......... 412/222 OR

FOREIGN PATENT DOCUMENTS 0216035 4/1987 European Pat. Off. .

OTHER PUBLICATIONS

"Differenz-und Ruckstandsbestimmung", Sartorius GmbH, Nov. 1986, pp. 1-2.
Haefer, "Oberflachen-und Dunnschicht-Technologie", Springer-Verlag . . . , 1987.

*Primary Examiner*—Kevin J. Teska
*Assistant Examiner*—Kamini S. Shah
*Attorney, Agent, or Firm*—Leydig, Voit & Mayer

[57] ABSTRACT

In an automatic thin-film measuring apparatus, the zero point of a precision balance is corrected according to directions from a data processing unit before and after the weight of a semiconductor substrate is measured, the surface temperature of the semiconductor substrate laid on a pan of the precision balance is measured, and the weight of the semiconductor substrate is measured when the surface temperature reaches a predetermined value. Furthermore, the cycle of variations in the zero point is found when the zero point is corrected, and the weight measurement of the semiconductor substrate is conducted during an integer multiple of the change cycle. Therefore, it is possible to enhance the precision of the weight measurement and its reproducibility and to shorten the measurement time without being influenced by low-frequency vibrations.

7 Claims, 7 Drawing Sheets

AUTOMATIC THIN-FILM MEASURING APPARATUS

BACKGROUND OF THE INVENTION

1. Field of the Invention

The present invention relates to an automatic thin-film measuring apparatus, and more particularly to an automatic thin-film measuring apparatus which measures the difference in weight of a semiconductor substrate before and after a thin film is formed thereon, and finds the thickness of the thin film.

2. Description of the Related Art

Typically, the thickness of a thin film formed on a semiconductor substrate is found based on the weight of the thin film. In this method, assuming that the thin film is uniform in thickness on the semiconductor substrate, the weights of the semiconductor substrate before and after the thin film is formed are measured, and the weight of the thin film is found based on the difference between the weights. Subsequently, the thickness of the thin film is found by dividing the weight of the thin film by the surface area of the semiconductor area (the area where the thin film is formed) and the specific gravity of the thin film.

A conventional thin-film measuring apparatus using such a method is illustrated in FIG. 9. In this thin-film measuring apparatus, the thickness of a thin film is measured by a measurement method shown in FIG. 10.

Referring to FIG. 9, a semiconductor substrate 6 is set on a pan 3 in a manual precision balance 11 by which the weight of the semiconductor substrate 6 is measured. In the precision balance 11, weight measurement is started in response to the actuation of a measurement start switch 12, and a measured value is displayed on a display portion 13 and transmitted to a data processing unit 7.

The conventional thin-film measuring apparatus has the above construction, and the measurement procedures thereof are conducted as follows. First, the semiconductor substrate 6, on which a thin film has not yet been formed, is laid on the pan 3 of the precision balance 1 with tweezers or the like, and an unillustrated door is shut by the operator. Then, the measurement start switch 12 is pressed when a measured weight value becomes stable, weight measurement is performed (Step S38). The measured weight value is transferred to the data processing unit 7 and stored as data on pre-formation measurement (weight measurement before a thin film is formed) (Step S39). Then, the semiconductor substrate 6 is taken out of the precision balance 11 with tweezers or the like.

Subsequently, the semiconductor substrate 6 on which a thin film has been formed is set on the pan 3 of the precision balance 11 with tweezers or the like, and the door is shut. The pre-formation measurement has been conducted on the semiconductor substrate 6. When a measured weight value becomes stable, the measurement start switch 12 is pressed, thereby starting weight measurement (Step S40). The measured weight value is transferred to the data processing unit 7 and stored as data on post-formation measurement (weight measurement after the thin film formed) (Step S41). The semiconductor substrate 6 is then taken out of the precision balance 11 with tweezers or the like. The weight of the thin film is found by subtracting the measured weight value in the pre-formation measurement from the measured weight value in the post-formation measurement in the data processing unit (Step S42), and the thickness of the thin film formed on the semiconductor substrate 6 is obtained by dividing the weight by the surface area of the semiconductor substrate 6 and the specific gravity of the thin film (Step S43).

In the thin-film measuring apparatus described above, the weight measurement of the semiconductor substrate 6 requires the use of human hands, the indicated value (for example, expressed in a digital number in seven figures) of the precision balance 11 may be changed due to vibrations and so on applied to the precision balance 11 when the semiconductor substrate 6 is set on the pan 3 or when the door is shut, and the measurement start switch 12 is turned on and the indicated value is read before the indicated value is stabilized. The measured value varies depending upon the timing of actuation of the measurement start switch 12 by the operator. For example, the measurement change rate in the use of the conventional precision balance 11 is approximately ±5% when a semiconductor substrate of approximately 25 g in weight (6-inch substrate) is used in the above thin-film measuring apparatus.

If the weight measurement is performed in a state where the semiconductor substrate 6 is not cooled to the room temperature, for example, at approximately 60° C., convection arises in the precision balance 11 and reduces measurement precision. Furthermore, the measurement precision is reduced by low-frequency disturbances resulting from the building and other apparatus. In addition, since the conventional thin-film measuring apparatus cannot be incorporated into a FA (factory automation) system, it is impossible to automate the measurement.

SUMMARY OF THE INVENTION

Accordingly, an object of the present invention is to provide an automatic thin-film measuring apparatus which can measure the weight of a semiconductor substrate and calculate the thickness of a thin film without using any human hands.

In order to achieve the above object, according to one aspect of the present invention, there is provided an automatic thin-film measuring apparatus which comprises a cassette containing a plurality of semiconductor substrates, a precision balance for measuring the weight of the semiconductor substrates before and after surface treatment, a handling robot for taking a predetermined semiconductor substrate out of the cassette and loading or unloading the semiconductor substrate on a pan of the precision balance, and a data processing unit for giving directions concerning the weight measurement and the operations of the handling robot and calculating the thickness of a surface-treated portion of the semiconductor substrate based on the difference in the weight of the semiconductor substrate before and after the surface treatment, and which corrects the zero of the precision balance according to the directions from the data processing unit, finds the change cycle of an zero value when the zero is corrected, and measures the weight of the semiconductor substrate at an integral multiple of the change cycle.

DESCRIPTION OF THE PREFERRED EMBODIMENTS

Figure 1:
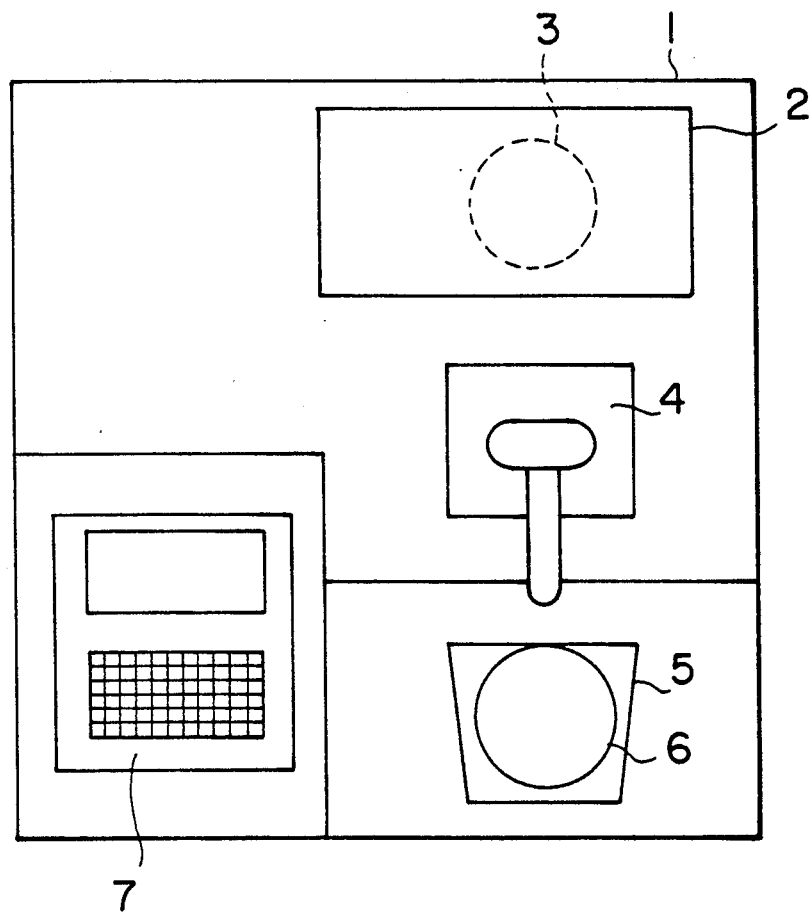
FIG. 1 is a schematic structural view of an automatic thin-film measuring apparatus according to an embodiment of the present invention.

FIG. 1 is a schematic structural view of an automatic thin-film measuring apparatus according to an embodiment of the present invention. In the drawings, the same numerals denote the same or corresponding components.

Referring to FIG. 1, a precision balance 2 for measuring the weight of a semiconductor substrate 6 has a pan 3 on which the semiconductor substrate 6 is placed. The semiconductor substrate 6 is conveyed by a (wafer) handling robot 4 between a loader portion (not shown) where a cassette 5 containing the semiconductor substrate 6 is to be placed and the pan 3. Furthermore, a data processing unit 7 is disposed to process data on measured weight values. The precision balance 2, the handling robot 4 and the data processing unit are included in the body of an automatic thin-film measuring apparatus 1.

In a system of the automatic thin-film measuring apparatus having the above-mentioned construction, the semiconductor substrate 6 in the cassette 5 placed in the loader portion is laid on the pan 3 of the precision balance 2 by the handling robot 4 to measure the weight of the semiconductor substrate 6. When the measurement is completed, the semiconductor substrate 6 is returned to the cassette 5 in the loader portion by the handling robot 4. The data processing unit 7 controls the system and performs data processing.

Figure 2:
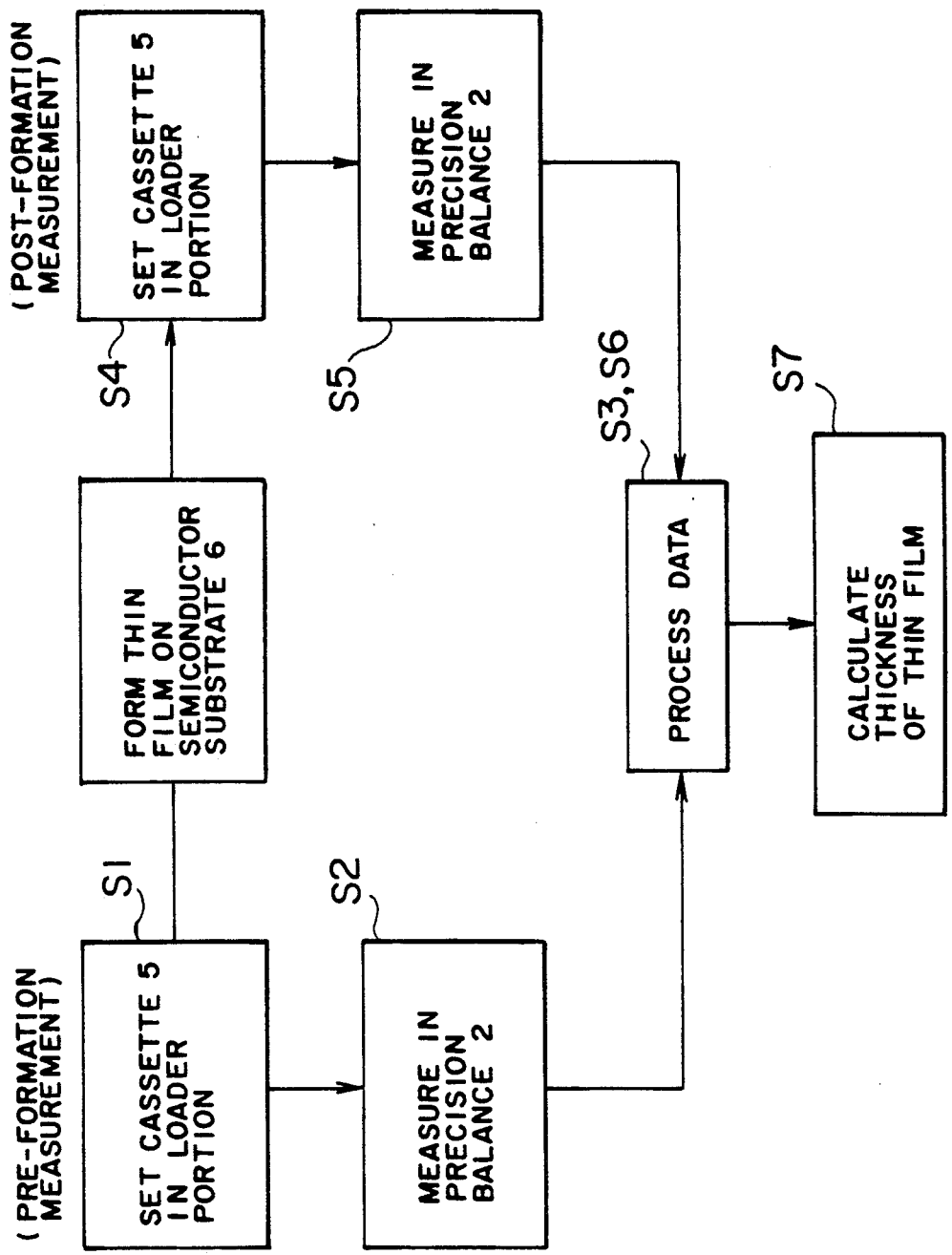
FIG. 2. is a flow chart schematically showing measurement operations of the automatic thin-film measuring apparatus.

FIG. 2 is a flow chart showing the measurement method of the automatic thin-film measuring apparatus. First, the cassette 5 containing the semiconductor substrate 6 before a thin film is formed thereon is placed in the loader portion (Step S1). Then, the handling robot 4 takes the designated semiconductor substrate 6 according to directions of the data processing unit 7 and places the semiconductor substrate 6 on the pan 3 of the precision balance 2 (Step S2). The door of the precision balance 2 is opened only when the semiconductor substrate 6 is handled and closed during a measurement operation in order to prevent a measured value from being changed due to wind from outside. In particular, this is advantageous in a clean room where air circulates from the ceiling to the floor.

The weight of the semiconductor substrate 6 laid on the pan 3 of the precision balance 2 is measured according to the directions of the data processing unit 7, and stored in the data processing unit 7 as pre-formation measured weight data (Step S3). Subsequently, the handling robot 4 returns the semiconductor substrate 6 from the pan 3 of the precision balance 2 to the initial position in the cassette 5. The pre-formation weight measurement is sequentially conducted on the semiconductor substrates designated by the data processing unit 7.

Then, the cassette 5 containing the semiconductor substrate 6 with a thin film formed thereon is placed in the loader portion (Step S4). The handling robot 4 takes the designated (once measured) semiconductor substrate 6 according to the directions of the data processing unit 7, and places the semiconductor substrate 6 on the pan 3 of the precision balance 2. The weight of the semiconductor substrate 6 on the pan 3 of the precision balance 2 is measured according to the directions of the data processing unit 7 (Step S5), and stored as post-formation measured weight data in the data processing unit 7 (Step S6). The weight of the thin film is found based on the difference between the pre-formation measured weight and the post-formation measured weight, and the thickness of the thin film is calculated by dividing the weight of the thin film by the specific gravity of the film which is previously obtained and the surface area of the semiconductor substrate 6 (Step S7). The handling robot 4 returns the semiconductor substrate 6 on the pan 3 to the initial position in the cassette 5. The post-formation weight measurement is sequentially conducted on the semiconductor substrates designated by the data processing unit 7, thereby calculating the thicknesses of the thin films.

Figure 3:
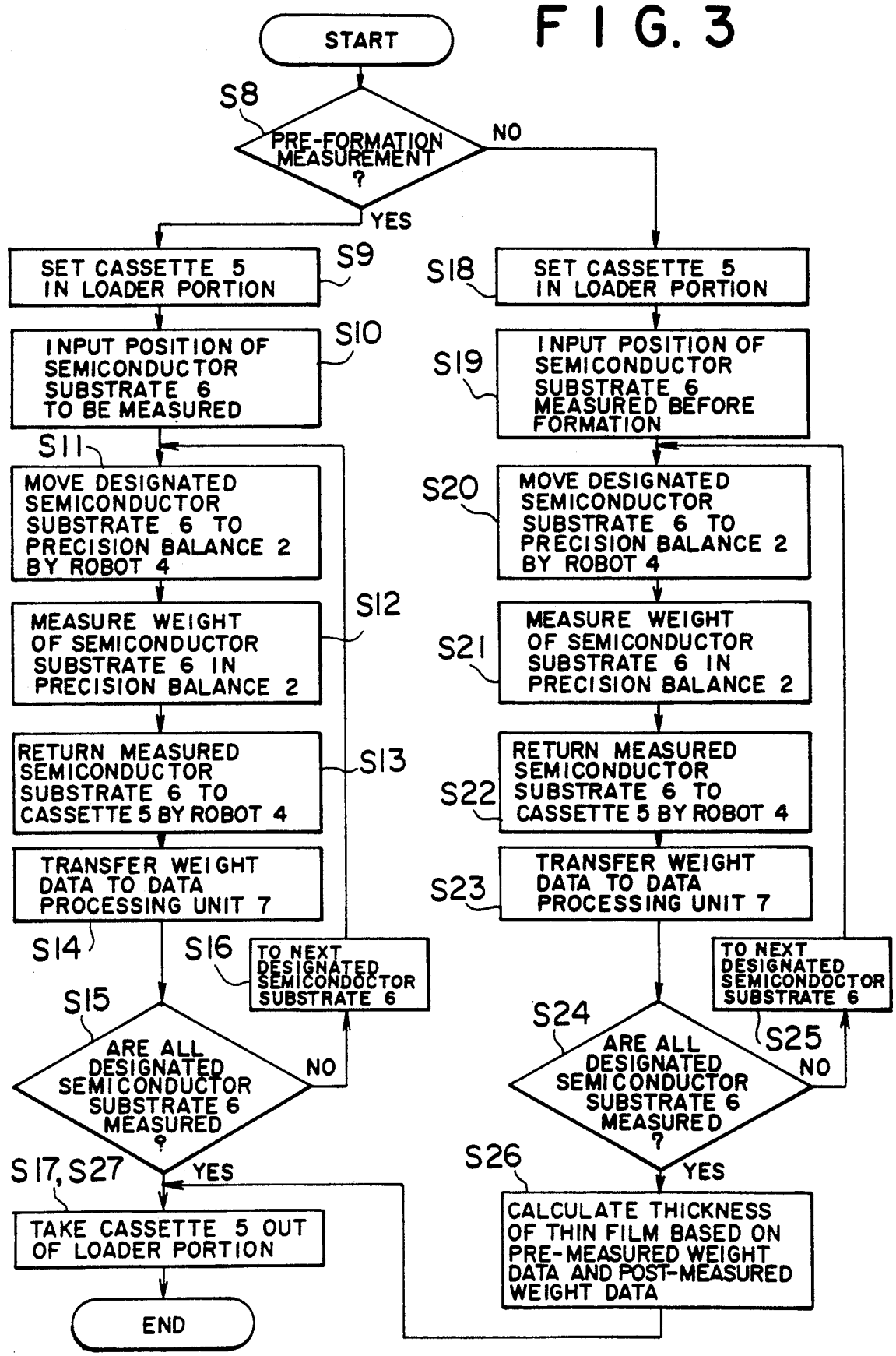
FIG. 3 is a flow chart showing the detailed measurement operations of the automatic thin-film measuring apparatus.

FIG. 3 is a flow chart showing the detailed measurement method of the automatic thin-film measuring apparatus. Before measurement, measurement information (data) on the semiconductor substrate 6 to be measured is transmitted to the data processing unit 7. The data includes cassette position data concerning which semiconductor substrate 6 in the cassette 5 is to be measured, data on whether measurement is being performed before or after a thin film is formed, and data to select an expression for converting the weight of a thin film into the thickness of the thin film if the measurement is performed after the thin film is formed. The measurement is carried out based on these data.

First, it is determined in Step S8 according to the data whether pre-formation measurement or post-formation measurement is to be performed. In the case of the pre-formation measurement, the cassette 5 is set in the loader portion (Step S9), and the weights of the designated semiconductor substrates 6 in the cassette 5 are sequentially measured based on the data (Steps S10 to S16). The measured data is added to the data processing unit 7 together with the position data of the cassette 5 (Step S14). When the measurement of the designated semiconductor substrates 6 is completed, the cassette 5 is taken out of the loader portion (Step S17), and the pre-formation measurement is finished.

In the case of the post-formation measurement, the weights of the designated, that is, pre-formation measured semiconductor substrates 6 in the cassette 5 are sequentially measured based on the pre-formation measurement data (Steps S19 to S25). The measured data is added to the data processing unit 7 (Step S23). The weight of the formed thin film is obtained from the difference between the pre-measured weight and the post-formation measured weight by the data processing unit 7, and the thickness of the thin film is calculated according to an expression for converting the film weight into the film thickness (Step S26). When the measurement of the designated semiconductor substrate 6 is finished, the cassette 5 is taken out of the loader portion and the post-formation measurement is completed (Step S27).

Figure 4:
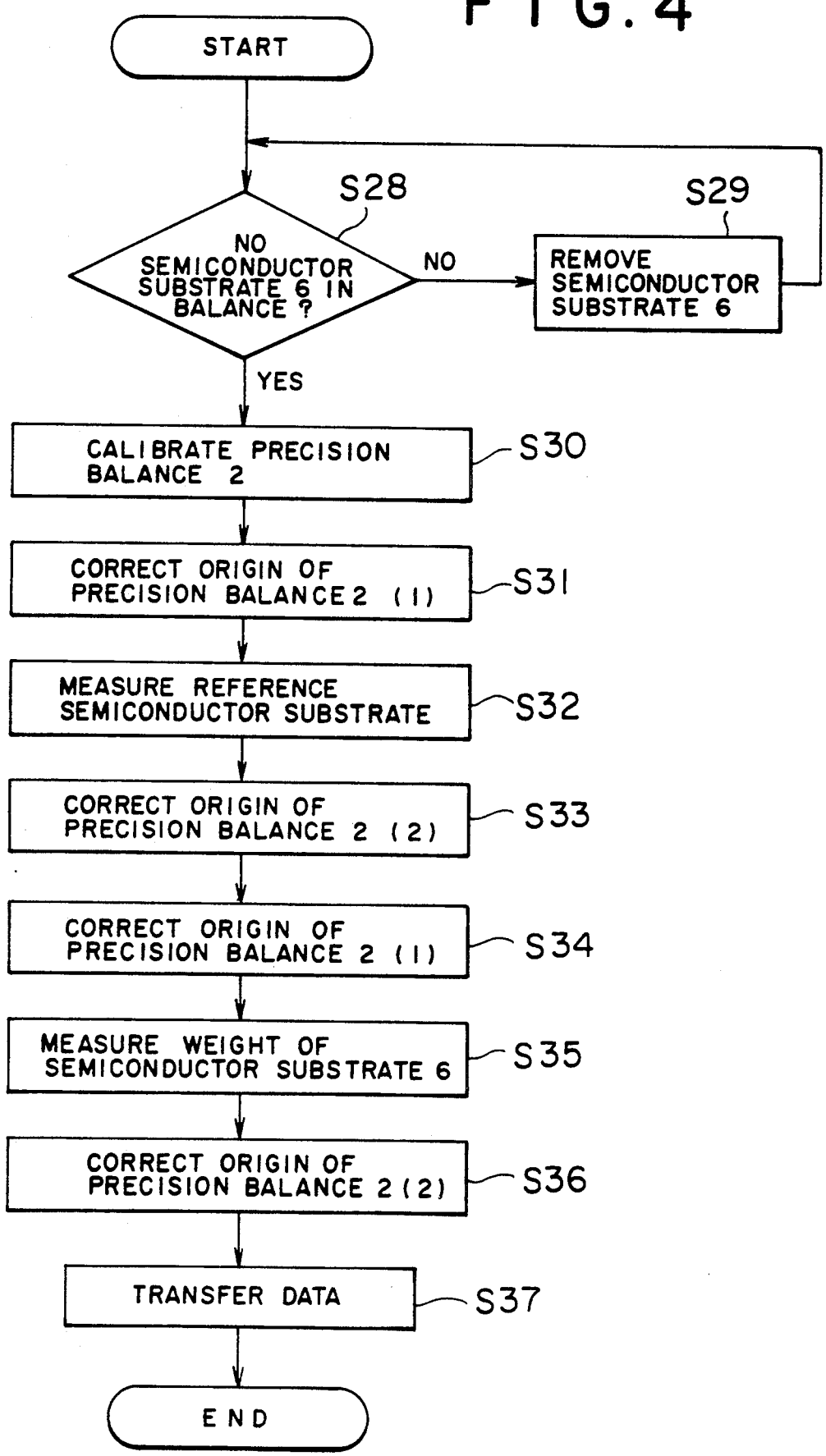
FIG. 4 is a flow chart showing calibration and zero correction of a precision balance according to the embodiment.

FIG. 4 is a flow chart showing the weight measurement operation of the semiconductor substrate in the automatic thin-film measuring apparatus of the present invention. In this flow chart, calibration (adjustment) and the zero correction of the precision balance 2 are performed.

First, it is determined whether the semiconductor substrate 6 is laid on the pan 3 (Step S28). If the semiconductor substrate 6 is present, it is removed (Step S29). The calibration of the precision balance 2 is performed in the state where the semiconductor substrate 6 is not present (Step S30).

Then, a reference semiconductor substrate whose weight is known is measured and the known weight and the measured weight are compared in order to check the difference measured by the precision balance 2 (Step S32). At this time, the zero of the precision balance 2 is corrected before and after the measurement of the reference semiconductor substrate, thereby enhancing measurement precision (Steps S31 and S33).

After it is determined that the difference between the weights is within a standard range, the weight of the semiconductor substrate 6 to be measured is measured (Step S35). At this time, the zero of the precision balance 2 is corrected before and after the measurement of the semiconductor substrate 6 in order to prevent the zero from being displaced (Steps S34 and S36). Then, the measured weight value is transferred to the data processing unit 7 (Step S37).

As described above, since the calibration and zero correction of the precision balance 2 are conducted for every weight measurement of the semiconductor substrate 6, it is possible to measure weight with extremely high precision. Furthermore, the weight of the semiconductor substrate 6 can be automatically measured by the handling robot 4. It is unnecessary to calibrate the precision balance 2 in every weight measurement of a semiconductor substrate 6, and one calibration operation may be performed for every lot of the semiconductor substrates 6. For example, if two of 25 semiconductor substrates 6 in one lot are measured, calibration may be conducted on only one of the two semiconductor substrates 6.

Figure 5:
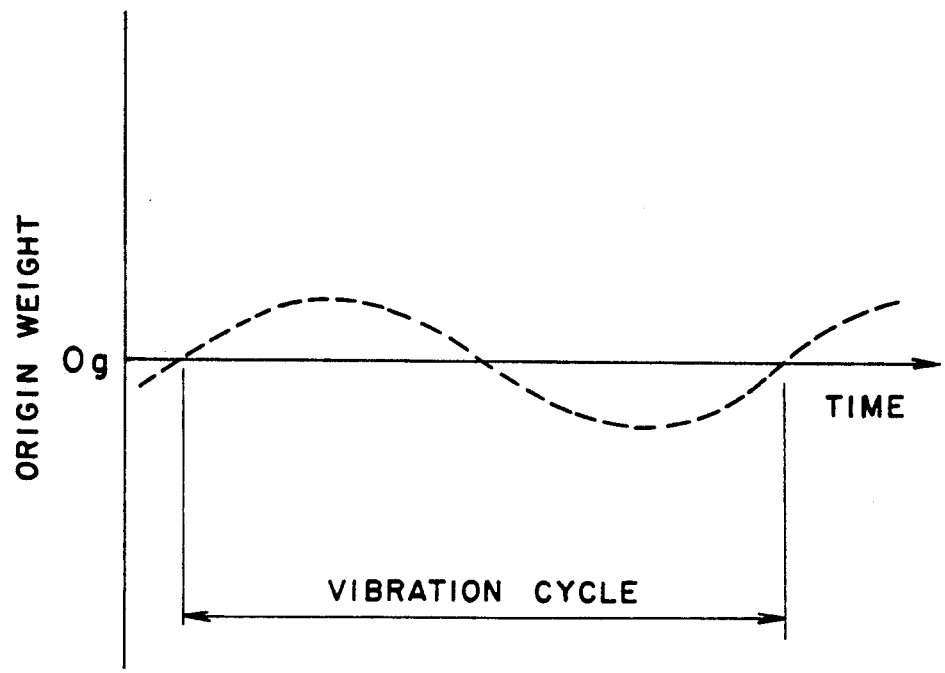
FIG. 5 is a diagram showing the vibration cycle of a place where the automatic thin-film measuring apparatus is installed.

The change of the zero value of the precision balance 2 with respect to the measurement time is taken into account in order to further improve the precision of weight measurement of the precision balance 2. In other words, when the zero of the precision balance 2 is corrected, a measured zero value changes with the passage of time as shown in FIG. 5. This results from low-frequency vibration of a building having a cycle of, for example, approximately several tens of seconds, and so on. Therefore, the change of the measured zero value is monitored, the vibration cycle of the floor where the measuring apparatus is installed is obtained, and weight measurement is performed at intervals equal to an integer multiple of the period of the vibration cycle.

In such a method, it is possible to eliminate the influence of the vibration and the like on the measured values by levelling the change of the measured value due to the vibration and the like, and to further enhance measurement precision. By correcting the zero as shown in FIG. 4 and measuring the weight at intervals equal corresponds to an integer multiple of the period of the vibration cycle shown in FIG. 5, a measurement change rate of ±1% is obtained.

In order to enhance the weight measurement precision further, the surface temperature of the semiconductor substrate 6 on the pan 3 is monitored, and weight measurement is started when the temperature of the semiconductor substrate 6 reaches the normal temperature. In other words, when the weight of the semiconductor substrate 6 immediately after a film is formed thereon is measured in the precision balance 2, if the temperature of the semiconductor substrate 6 is higher than the normal temperature, air convection is caused inside a measurement room (not shown) where the pan 3 of the precision balance 2 is located, resulting in errors in the measured values.

Figure 6:
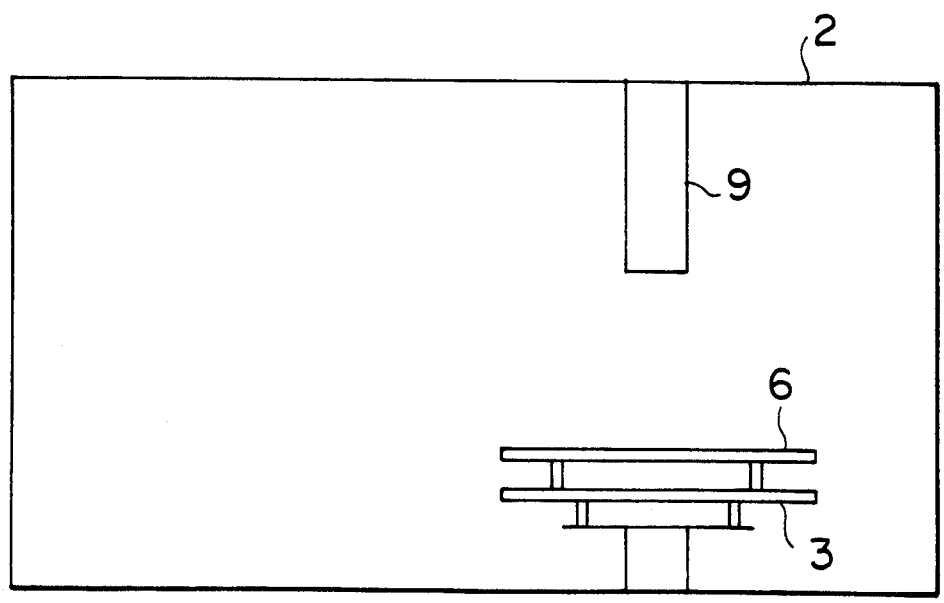
FIG. 6 is a schematic view of a precision balance having a radiation thermometer.

Accordingly, as shown in FIG. 6, a thermometer for monitoring the temperature of the surface of the semiconductor substrate 6 on the pan 3, for example, a radiation thermometer 9 is disposed in the precision balance 2. The surface temperature of the semiconductor substrate 6 is monitored by the radiation thermometer 9, a weight measurement is automatically started when the temperature becomes a predetermined value, for example, the normal temperature. Such a method makes it possible to eliminate errors in measurement due to air convection, and to start the weight measurement immediately after the temperature of the semiconductor substrate 6 reaches the normal temperature.

Figure 7:
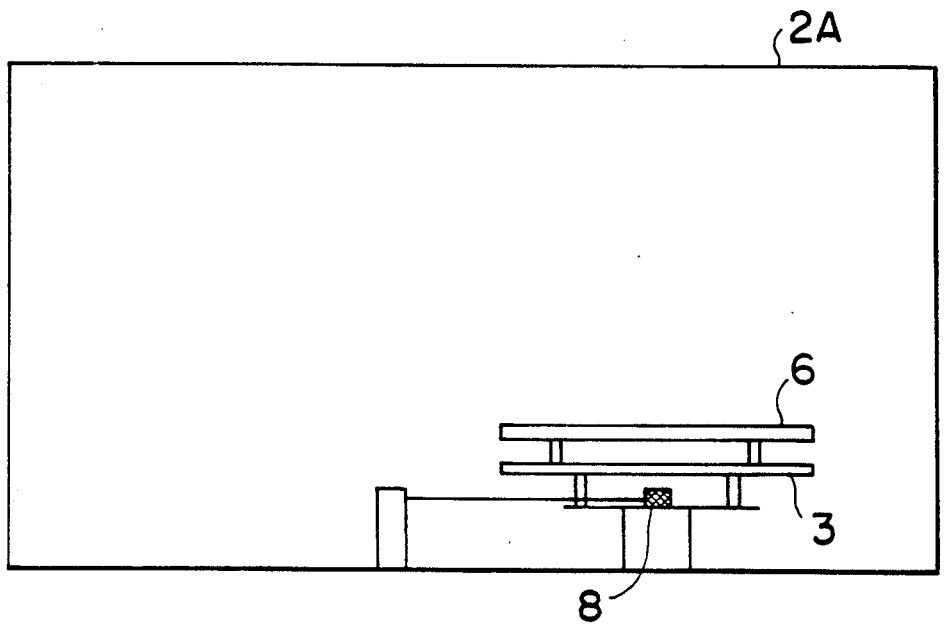
FIG. 7 is a schematic view of a precision balance having a built-in weight.

Instead of the precision balance 2 in the above embodiment, a precision balance 2A having a built-in weight 8 whose principal part is shown in FIG. 7 may be used to enhance the measurement precision of the balance itself. If a precision balance without the built-in weight 8 is set in a place where vibration occurs, measurement is performed while no load is applied to the precision balance 2. In short, the zero value is erratic due to the vibration in the installation environment at the origin.

The built-in weight 8 makes it possible to perform measurement even at the origin where some load is applied to the precision balance 2. Therefore, the zero value can be prevented from being changed by the vibration and the measurement precision can be enhanced. Furthermore, the weight of the built-in weight 8 of the precision balance 2A can be changed according to stability of the zero value to achieve an adjustment in accordance with the vibration condition.

Figure 8:
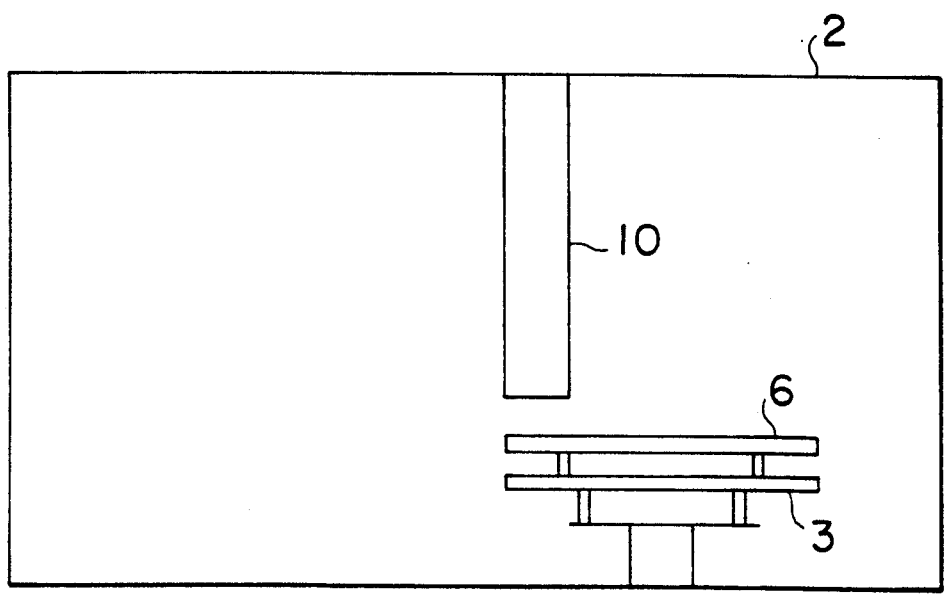
FIG. 8 is a schematic view of a precision balance having a reflectometer.
Figure 9:
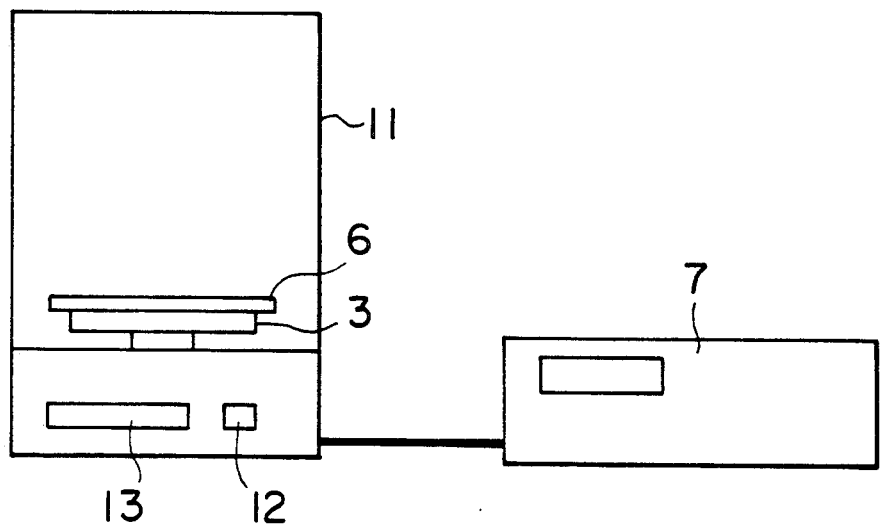
FIG. 9 is a schematic structural view of a conventional thin-film measuring apparatus.
Figure 10:
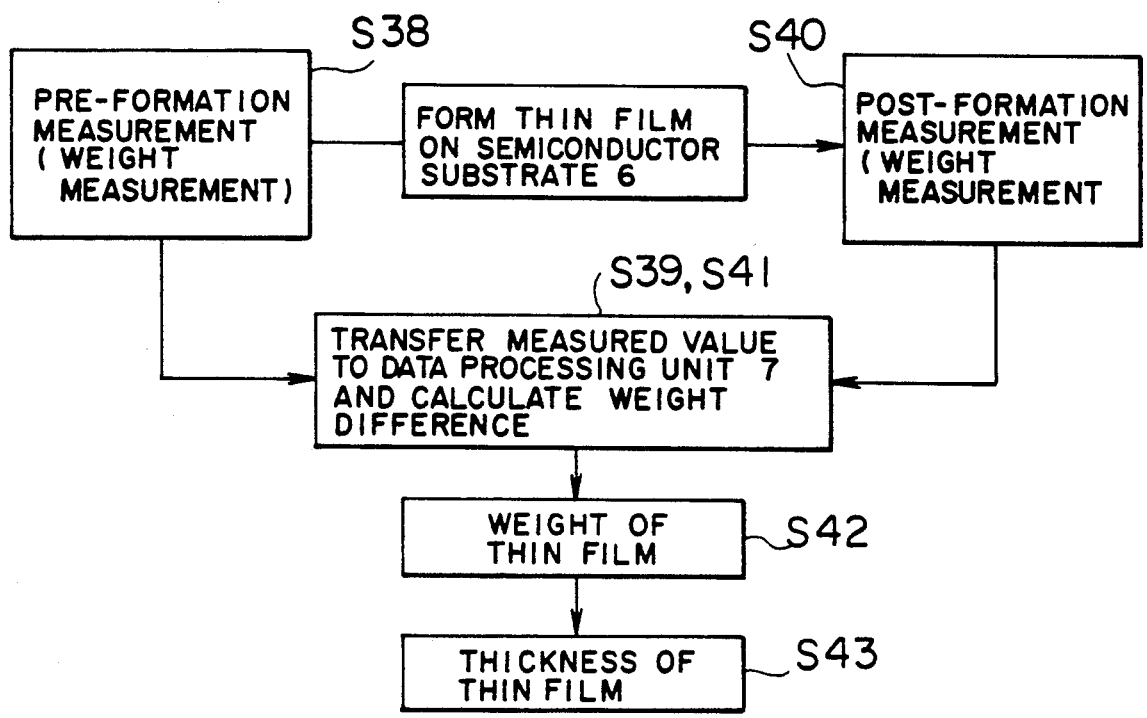
FIG. 10 is a flow chart schematically showing measurement operations of the conventional thin-film measuring apparatus.

When the weight of the semiconductor substrate 6 is measured in the precision balance 2, the kind of the thin film on the surface of the semiconductor substrate 6 can be determined by measuring the reflectance of the semiconductor substrate 6 with, for example, a reflectometer 10 as shown in FIG. 8. As a result, it is unnecessary to transmit the data as to whether the present measurement is a pre-formation measurement a post-formation measurement and the data for selecting an expression to convert the weight of the thin film into the thickness of the thin film in the post-formation measurement to the data processing unit 7, and it is possible to enhance the efficiency of automation.

Furthermore, although a semiconductor substrate is described in the above-mentioned embodiment, a metallic substrate, a plastic substrate and other substrates may be used with the same advantages as described above.

Although the thickness of the thin film is found based on the increase in weight of the semiconductor substrate due to the formation of the thin film in the above embodiment, the thickness of a layer removed by etching may be found based on the decrease in weight of the semiconductor substrate due to etching. This has the same result as above.

As described above, according to the present invention, it is possible to enhance the precision of weight measurement and reproducibility, to shorten the process time, to the influence of low-frequency vibration, and to cope with FA. Furthermore, it is possible to eliminate measurement errors resulting from convection in the precision balance caused when the temperature of the semiconductor substrate is higher than the normal temperature, to perform weight measurement immediately after the temperature of the semiconductor substrate reaches the normal temperature, and to shorten the measurement time.

What is claimed is:

1. An automatic thin-film measuring apparatus comprising:
    a cassette for containing a plurality of semiconductor substrates;
    a precision balance for measuring the weight of semiconductor substrates;
    a handling robot for transferring a semiconductor substrate between said cassette and said precision balance; and
    a data processing unit for controlling the weight measurement by said precision balance and said handling robot, for calculating the thickness of a layer on said semiconductor substrate based on the weight measured by said precision balance, for correcting a zero point of said precision balance, and for sensing a period of cyclic variations of the zero point and controlling said precision balance to weigh semiconductor substrates at intervals equal to an integer multiple of the period of the cyclic variations.

2. The automatic thin-film measuring apparatus according to claim 1 wherein said data processing unit corrects the zero point of said precision balance before and after the weight of a semiconductor substrate is measured.

3. The automatic thin-film measuring apparatus according to claim 1 wherein said data processing unit calibrates said precision balance before the weight of a semiconductor substrate is measured.

4. The automatic thin-film measuring apparatus according to claim 1 wherein said precision balance includes a built-in weight.

5. The automatic thin-film measuring apparatus according to claim 1 wherein said data processing unit calculates the thickness of a thin film deposited on a semiconductor substrate.

6. The automatic thin-film measuring apparatus according to claim 1 wherein said data process unit calculates the thickness of a layer removed from a semiconductor substrate by etching.

7. The automatic thin-film measuring apparatus according to claim 1 comprising a temperature sensor for sensing a surface temperature of a semiconductor substrate disposed on said precision balance wherein said data processing unit controls said precision balance in response to said temperature sensor to weigh semiconductor substrates only when the sensed surface temperature is a prescribed value.

* * * * *